United States Patent [19]
Miller et al.

[11] Patent Number: 5,879,655
[45] Date of Patent: Mar. 9, 1999

[54] METHOD OF MAKING MICROPOROUS NON-ZEOLITIC MOLECULAR SIEVES

[75] Inventors: Stephen J. Miller; Charles R. Wilson, both of San Francisco, Calif.

[73] Assignee: Chevron Research and Technology Company, San Francisco, Calif.

[21] Appl. No.: 970,369

[22] Filed: Nov. 2, 1992

[51] Int. Cl.⁶ .................................................. C01B 39/54
[52] U.S. Cl. .......................... 423/702; 423/701; 423/704; 423/718; 423/306; 423/329.1; 423/330.1; 423/DIG. 30
[58] Field of Search ............................. 423/306, DIG. 30, 423/329.1, 330.1, 701, 702, 704, 718

[56] References Cited

U.S. PATENT DOCUMENTS

| | | | |
|---|---|---|---|
| 4,310,440 | 1/1982 | Wilson et al. | 252/435 |
| 4,440,871 | 4/1984 | Lok et al. | 502/214 |
| 4,567,029 | 1/1986 | Wilson et al. | 423/306 |
| 4,686,093 | 8/1987 | Flanigen et al. | 423/306 |
| 4,713,227 | 12/1987 | Derouane et al. | 423/305 |
| 4,861,743 | 8/1989 | Flank et al. | 502/214 |
| 4,891,197 | 1/1990 | Derouane et al. | 423/279 |
| 4,898,722 | 2/1990 | Derouane et al. | 423/328 |
| 4,973,785 | 11/1990 | Lok et al. | 585/481 |
| 5,102,643 | 4/1992 | Kresge et al. | 423/328 |
| 5,114,563 | 5/1992 | Lok et al. | 208/114 |

OTHER PUBLICATIONS

Komarneni & Roy "The role of gel chemistry in synthesis of aluminophosphate molecular sieves" Zeolites, vol. 11, Feb. 1991. pp. 142–148.

*Primary Examiner*—Glenn Caldarola
*Attorney, Agent, or Firm*—Richard J. Sheridan

[57] ABSTRACT

The present invention is a method for synthesizing non-zeolitic molecular sieves which have a three-dimensional microporous framework structure comprising [$AlO_2$] and [$PO_2$] units. In preparing the reaction mixture, a critical feature of the invention is for the molar ratio of the templating agent to phosphorus be greater than about 0.05 before the molar ratio of aluminum to phosphorus is greater than about 0.5.

19 Claims, 1 Drawing Sheet

5,879,655

METHOD OF MAKING MICROPOROUS NON-ZEOLITIC MOLECULAR SIEVES

BACKGROUND OF THE INVENTION

1. Field of the Invention

The present invention relates to a method for the synthesis of non-zeolitic molecular sieves. More particularly, the method relates to non-zeolitic molecular sieves which may be synthesized from an aqueous reaction mixture having a $Al_2O_3:P_2O_5$ molar ratio greater than 0.3.

2. Description of the Related Art

Recently, there have been reported several classes of microporous compositions which are not zeolitic, and which will collectively be referred to hereinafter as "non-zeolitic molecular sieves", which term will be more precisely defined hereinafter. These materials are formed from $[AlO_2]$ and $[PO_2]$ tetrahedra and have electrovalently neutral frameworks, for example, as in the case of silica polymorphs and include the crystalline aluminophosphate compositions disclosed in U.S. Pat. No. 4,310,440 issued Jan. 12, 1982 to Wilson et al., the disclosure of which is incorporated herein by reference.

Classes of aluminophosphate compositions comprise $AlPO_4$, SAPO (silicoaluminophosphate), MeAPO (metalloaluminophosphate), and ElAPO (nonmetal substituted aluminophosphate families). Uses for crystalline aluminophosphate compositions have included molecular sieves, catalysts, and catalyst carriers.

U.S. Pat. No. 4,440,871, issued on Apr. 3, 1984 to Lok et al., the entire disclosure of which is incorporated herein by reference, describes a class of silicon-substituted aluminophosphate non-zeolitic molecular sieves which are both microporous and crystalline. These materials have a three-dimensional crystal framework of $[PO_2]$, $[AlO_2]$ and $[SiO_2]$ tetrahedral units and, exclusive of any alkali metal or calcium which may optionally be present, an as-synthesized empirical chemical composition on an anhydrous basis of:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from zero to 0.3, the maximum value in each case depending upon the molecular dimensions of the templating agent and the available void volume of the pore system of the particular silicoaluminophosphate species involved; and "x", "y", and "z" represent the mole fractions of silicon, aluminum and phosphorus, respectively, present as tetrahedral oxides. The minimum value for each of "x", "y", and "z" is 0.01 and preferably 0.02. The maximum value for "x" is 0.98; for "y" is 0.60; and for "z" is 0.52. These silicoaluminophosphates exhibit several physical and chemical properties which are characteristic of both aluminosilicate zeolites and aluminophosphates.

U.S. Pat. No. 4,943,424, issued on Jul. 24, 1990 to Miller the entire disclosure of which is incorporated herein by reference, describes a crystalline silicoaluminophosphate molecular sieve (designated therein as "SM-3") having an as synthesized composition empirical chemical composition on an anhydrous basis of:

$$mR:(Si_xAl_yP_z)O_2$$

wherein "R" represents at least one organic templating agent present in the intracrystalline pore system; "m" represents the moles of "R" present per mole of $(Si_xAl_yP_z)O_2$ and has a value of from 0.02 to 2, and "x", "y", and "z" represent the mole fractions of silicon, aluminum and phosphorus, respectively, present as tetrahedral oxides. The minimum value for "x" is 0.02; for "y" is 0.24; and for "z" is 0.24. The maximum value for "x" is 0.51; for "y" is 0.50; and for "z" is 0.51.

U.S. Pat. No. 4,500,651, issued to Lok et al. on Feb. 19, 1985 the entire disclosure of which is incorporated herein by reference, describes a class of titanium-containing non-zeolitic molecular sieves whose chemical composition in the as-synthesized and anhydrous form is represented by the unit empirical formula:

$$mR:(Ti_xAl_yP_z)O_2$$

wherein "R" represents at least one organic templating agent present in the intracrystalline pore system; "m" represents the moles of "R" present per mole of $(Ti_xAl_yP_z)O_2$ and has a value of between zero and about 5.0; and "x", "y" and "z" represent the mole fractions of titanium, aluminum and phosphorus, respectively, present as tetrahedral oxides.

U.S. Pat. No. 4,567,029, issued on Jan. 28, 1986 to Wilson et al., the entire disclosure of which is incorporated herein by reference, describes a class of crystalline metal aluminophosphate non-zeolitic molecular sieves (designated therein as "MeAPO") having three-dimensional microporous framework structures of $[MO_2]$, $[AlO_2]$ and $[PO_2]$ tetrahedral units and having an empirical chemical composition on an anhydrous basis expressed by the formula:

$$mR:(M_xAl_yP_z)O_2$$

wherein "R" represents at least one organic templating agent present in the intracrystalline pore system; "m" represents the moles of "R" present per mole of $(M_xAl_yP_z)O_2$ and has a value of from zero to 0.3; "M" represents at least one metal of the group magnesium, manganese, zinc and cobalt; and "x", "y", and "z" represent the mole fractions of the metal "M", aluminum and phosphorus, respectively, present as tetrahedral oxides.

U.S. Pat. No. 4,544,143, the entire disclosure of which is incorporated herein by reference, describes a class of crystalline ferroaluminophosphate non-zeolitic molecular sieves having a three-dimensional microporous framework structure of $[FeO_2]$, $[AlO_2]$ and $[PO_2]$ tetrahedral units and having an empirical chemical composition on an anhydrous basis expressed by the formula:

$$mR:(Fe_xAl_yP_z)O_2$$

wherein "R" represents at least one organic templating agent present in the intracrystalline pore system; "m" represents the moles of "R" present per mole of $(Fe_xAl_yP_z)O_2$ and has a value of from zero to 0.3; and "x", "y" and "z" represent the mole fractions of the iron, aluminum and phosphorus, respectively, present as tetrahedral oxides.

U.S. Pat. No. 4,686,093, issued on Aug. 11, 1987 to Flanigen et al., the entire disclosure of which is incorporated herein by reference, discloses a class of crystalline non-zeolitic molecular sieves designed therein as "FCAPO" (denoting "Framework Constituents"), having a three-dimensional tetrahedral framework composed of $[AlO_2]$, $[PO_2]$, and $[MO_2]$ units and having an empirical chemical composition on an anhydrous basis expressed by the formula:

$$mR:(M_xAl_yP_z)O_2$$

wherein "R" represents at least organic templating agent present in the intracrystalline pore system; "m" represents the moles of "R" present per mole of $(M_xAl_yP_z)O_2$ and has a value of from zero to 0.3; M represents at least two elements present in the tetrahedral units selected from the group consisting of arsenic, beryllium, boron, chromium, gallium, germanium, lithium, and vanadium, and "x", "y" and "z" represent the mole fraction of "M", aluminum, and phosphorus, respectively, present as tetrahedral oxides.

U.S. Pat. No. 4,973,785, issued on Nov. 27, 1990 to Lok et al., the entire disclosure being incorporated herein by reference, discloses a class of crystalline non-zeolitic molecular sieves, designated therein as "ELAPSO". The ELAPSO compositions are formed with elements capable of forming framework oxide units in the presence of $[AlO_2]$, $[SiO_2]$ and $[PO_2]$ tetrahedral units where element "EL" is at least one element capable of forming a three-dimensional oxide framework in the presence of aluminum, phosphorus and silicon oxide units, and has a mean "T-O" distance in tetrahedral oxide structures of between about 1.51 Angstroms and about 2.06 Angstroms, has a cation electronegativity between about 125 kcal/g-atom and about 310 kcal/g-atom and is capable of forming stable EL-O-P, EL-O-AL, and EL-O-EL bonds in crystalline three-dimension al oxide structures.

Typically, the aforementioned classes of non-zeolitic molecular sieves are synthesized by hydrothermally crystallizing a hydrous gel made from a substantially homogeneous aqueous reaction mixture containing reactive sources of aluminum, phosphorus, silicon (in the case of the silicoaluminophosphates) and the other element(s), if any, required in the molecular sieve. The reaction mixture also preferably contains an organic templating, i.e., structure-directing, agent, preferably a compound of an element of Group VA of the Periodic Table, and/or optionally an alkali or other metal. The reaction mixture is generally placed in a sealed pressure vessel, preferably with an inactive metallic surface or alternatively, lined with an inert plastic material such as polytetrafluoroethylene and heated, preferably under autogenous pressure, at a temperature between 50° C. and 250° C., and preferably between 100° C. and 200° C., until crystals of the non-zeolitic molecular sieve product are obtained. Usually this is for a period of from several hours to several weeks. Effective crystallization times from about 2 hours to about 30 days are generally employed. The molecular sieve is recovered by any convenient method, for example, centrifugation or filtration.

In preparing the hydrous gel, it has been reported by Romarneni and Roy (*The Role of Gel Chemistry in Synthesis of Aluminophosphate Molecular Sieves*, Zeolites, vol. 11, February 1991, pp. 142–148) that the gel's chemistry is essential in the aluminophosphate's formation. On a laboratory scale where reagents are readily mixed, the crystallization methods described in the aforementioned patents have been effective in producing non-zeolitic molecular sieves in high yields. However, for larger scale preparations, synthesis techniques require the constituents be combined over a substantially longer period of time. When the aluminum source is added to the phosphorus source there is a voluminous coagulum of an aluminum specie or species; resulting in a final mixture that is thick, viscous, and not readily dispersible. Therefore, there is a need for a method for producing non-zeolitic molecular sieves in quantities sufficient for commercial applications, and that avoids the problematic aluminum coagulation.

As used herein the terms "coagulum" and "precipitate" are used interchangeably and refers to the separation and binding together of the reagent, in solid form, from the solution.

Among other factors, when a crystalline, non-zeolitic molecular sieve is synthesized from a reaction mixture having a $Al_2O_3:P_2O_5$ molar ratio greater than 0.3, it has now unexpectedly been found that it is critical that at least some of the templating agent(s) be added to the aqueous reaction mixture before a significant amount of the aluminum source is added. This reduces the precipitation of the aluminum and thereby the formation of a viscous gel.

It is, therefore, the principal object of the process embodiment of the present invention to limit, and preferably avoid, the viscous precipitate that forms during preparation of crystalline, non-zeolitic molecular sieves having a three-dimensional microporous framework structure comprising $[AlO_2]$ and $[PO_2]$ units. This and other objects are accomplished by the invention set forth in the description and examples below.

SUMMARY OF THE INVENTION

In its broadest process embodiment, the present invention is a method for preparing a crystalline, non-zeolitic molecular sieve having a three-dimensional microporous framework structure comprising $[AlO_2]$ and $[PO_2]$ units, wherein the method for preparing the molecular sieve includes the steps of preparing an aqueous reaction mixture comprising at least one reactive source of phosphorus, at least one reactive source of aluminum, and at least one templating agent and having a $Al_2O_3:P_2O_5$ molar ratio greater than 0.3; and maintaining the aqueous reaction mixture at conditions suitable for crystals of the molecular sieve to form, the improvement comprising controlling the addition of the phosphorus source, aluminum source, and the templating agent to the aqueous reaction mixture so that the templating agent to the phosphorus molar ratio is greater than about 0.05 before the aluminum to phosphorus molar ratio reaches about 0.5. Preferably, the phosphorus is present in the aqueous reaction mixture before the aluminum source is added.

One preferred group of non-zeolitic molecular sieves to be produced by the process of the present invention is the aluminophosphates ($AlPO_4$'s) claimed in U.S. Pat. No. 4,310,440, desirably $AlPO_4$-5, $AlPO_4$-11, $ALPO_4$-31, and $AlPO_4$-41. The preferred organic templating agents for the synthesis of the $AlPO_4$'s are tetraethylammonium hydroxide, tetrapropylammonium hydroxide, diethylethanolamine, di-n-propylamine, and tripropylamine.

A second preferred group of non-zeolitic molecular sieves to be produced by the process of the present invention is the silicoaluminophosphates (SAPO's) claimed in U.S. Pat. No. 4,440,871, desirably SAPO-5, SAPO-11, SAPO-31, and SAPO-41, and most desirably SAPO-11. The preferred organic templating agents for the synthesis of SAPO's are tetraethylammonium hydroxide, tetrapropylammonium hydroxide, diethanolamine, and di-n-propylamine.

The term "non-zeolitic molecular sieves" as used herein has the same meaning as given in U.S. Pat. No. 4,861,743, columns 5 and 6, the disclosure of which is incorporated herein by reference and the inclusion of U.S. Pat. No. 4,943,424.

BRIEF DESCRIPTION OF THE DRAWING

The FIGURE is a ternary diagram showing the compositional parameters of certain silicoaluminophosphates made by the process of the present invention in terms of mole fractions of silicon, aluminum and phosphorus. In the FIGURE, "x", "y" and "z" represent, respectively, the mole fractions of silicon, aluminum and phosphorus.

DETAILED DESCRIPTION OF THE INVENTION

Figure 1:
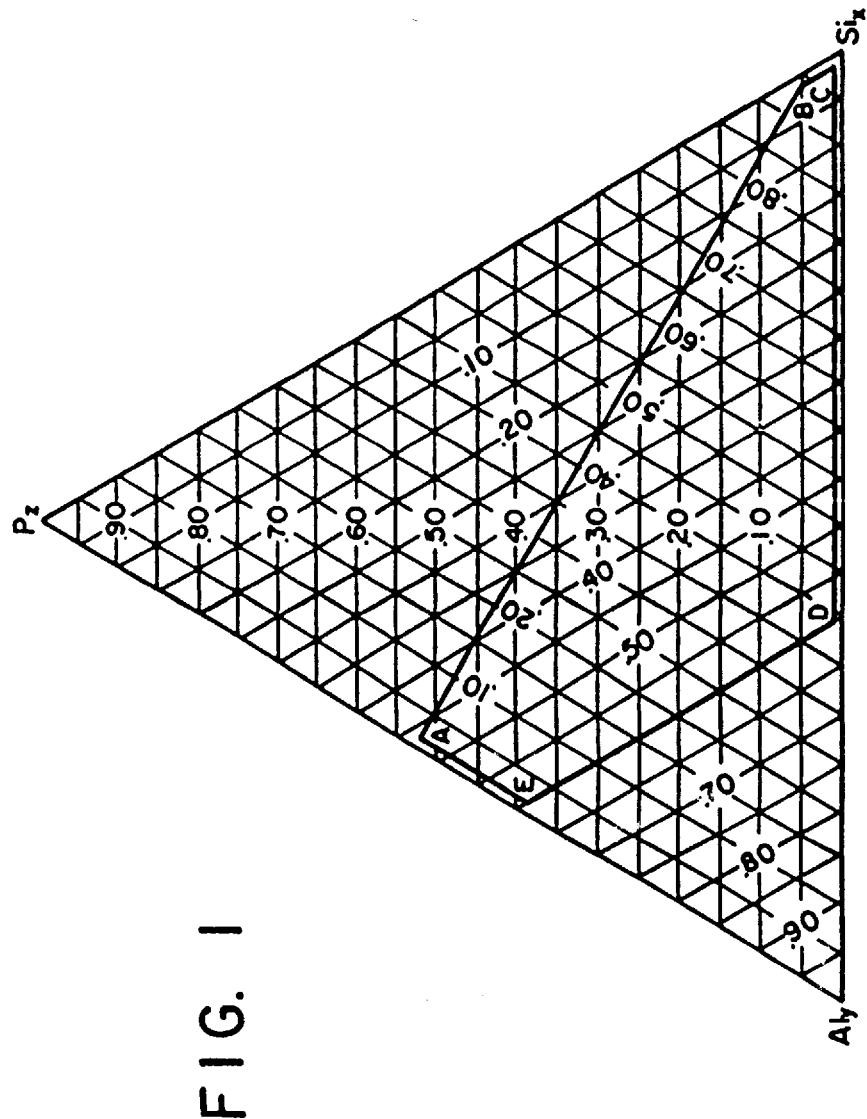

The molecular sieves which can be produced by the process of the present invention comprise a large number of non-zeolitic molecular sieves, each having a three-dimensional microporous framework structure comprising $[AlO_2]$ and $[PO_2]$ units. Optionally, these microporous molecular sieves may include with the aluminum, phosphorus and, in the case of the silicoaluminophosphates, silicon one or more other elements. Non-limiting examples of such molecular sieves includes those disclosed in U.S. Pat. Nos. 4,310,440; 4,440,871; 4,500,651; 4,544,143; 4,567,029; 4,686,093; 4,943,424; and 4,973,785.

The proportions of the various components in the liquid reaction mixture affect, inter alia, the rate at which the synthesis progresses, the yield, and the crystal framework of the non-zeolitic molecular sieve. Broadly, the reaction mixture of the present invention has an $Al_2O_3:P_2O_5$ molar ratio greater than 0.3. In the synthesis of a specific non-zeolitic molecular sieve, the constituents molar ratio in the sieve's reaction mixture is given in the aforementioned U.S. patents' description.

Surprisingly, in preparing the aqueous reaction mixture, the amounts in which the above mentioned elements are mixed together are critical in effecting the aluminum source's coagulation. In accordance with the present invention, a reaction mixture is prepared wherein a sufficient quantity of templating agent is added to the reaction mixture to reduce or eliminate the coagulation of the aluminum source in the reaction mixture. Preferably, in preparing the aqueous reaction mixture, the phosphorus source is added prior to the addition of the aluminum source. Accordingly, the molar ratio of the templating agent to phosphorus in the reaction mixture should be greater than about 0.05, preferably, greater than about 0.1, and most preferably greater than about 0.2 before the molar ratio of aluminum to phosphorus in the reaction mixture is greater than about 0.5. Preferably, the above molar ratios of templating agent to phosphorus should be present in the reaction mixture before the molar ratio of aluminum to phosphorus in the reaction mixture is greater than about 0.3, and most preferably greater than about 0.25.

The term "templating agent" although used in the singular includes the plural. Thus, if more than one template is used in the reaction mixture then to determine the molar ratio of templating agent present in the mixture, the molar ratios of each template should be added together. Additionally, the above molar ratio of template includes the amount of any compound that itself does not contribute to the formation of the desired non-zeolitic molecular sieve but does reduce the viscosity of the reaction mixture. Such a compound would not interfere with the molecular directing properties of the template. An example would include the addition of small amines to supplant the extensive use of the higher molecular weight quaternary ammonium compounds.

In preparing a targeted non-zeolitic molecular sieve, one of ordinary skill would follow the teachings known in the art for synthesizing the desired sieve; such as, the amount and types of reagents, crystallization temperatures, etc., but, it is critical to the instant invention that the molar ratio of the templating agent to phosphorus in the reaction mixture be greater than about 0.05 before the molar ratio of aluminum to phosphorus in the reaction mixture is greater than about 0.5. Subsequently, in crystallizing the targeted non-zeolitic molecular sieve, the reaction mixture should have the proper molar amounts and proper conditions should be maintained for producing the targeted molecular sieve.

As mentioned above, the aqueous reaction mixture used in the method of the present invention comprises at least one reactive source of phosphorus. Preferably, the reactive phosphorus source is phosphoric acid or a salt thereof. Organic phosphates such as triethyl phosphate may also be employed as well as crystalline or amorphous aluminophosphates such as the $AlPO_4$ compositions of U.S. Pat. No. 4,310,440. Conventional phosphorus salts, such as sodium metaphosphate, may be used, at least in part, as the phosphorus source, but are not preferred.

Sources of aluminum used in zeolite synthesis, such as, gibbsite, sodium aluminate, alum, and aluminum trichloride can be employed equally effectively. Preferably the aluminum source is either pseudoboehmite or an aluminum alkoxide, such as aluminum isopropoxide. Crystalline or amorphous aluminophosphates which are a suitable source of phosphorus are also suitable sources of aluminum.

When the liquid reaction mixture is to contain a source of silica, the silica may be any silica source capable of being dissolved and/or dispersed in the liquid reaction mixture. Preferably the silica is introduced into the reaction mixture as either a silica sol or as fumed silica.

The liquid reaction mixture used in the process of the present invention also contains at least one organic templating agent. The organic templating agent can be any of those heretofore proposed for use in the synthesis of conventional non-zeolitic molecular sieves. In general these compounds contain elements of Group VA of the Periodic Table of Elements, particularly nitrogen, phosphorus, arsenic and antimony, preferably nitrogen or phosphorus and most preferably nitrogen, which compounds also contain at least one alkyl or aryl group having from 1 to 8 carbon atoms. Particularly preferred compounds for use as templating agents are the amines, quaternary phosphonium and quaternary ammonium compounds, the latter two being represented generally by the formula $R_4X+$ wherein "X" is phosphorus or nitrogen and each R is an alkyl or aryl group containing from 1 to 8 carbon atoms. Polymeric quaternary ammonium salts such as $[(C_{14}H_{32}N_2)(OH)_2]x$ wherein x has a value of at least 2 are also suitably employed. The mono-, di- and tri-amines are advantageously utilized, either alone or in combination with a quaternary ammonium compound or other templating compound. Mixtures of two or more templating agents can either produce mixtures of the desired non-zeolitic molecular sieves or the more strongly directing templating species may control the course of the reaction with the other templating species serving primarily to establish the pH conditions of the reaction gel. Representative templating agents include tetramethylammonium, tetraethylammonium, tetrapropylammonium and tetrabutylammonium ions; tetrapentylammonium ion; di-n-propylamine; tripropylamine; triethylamine; triethanolamine; piperidine; cyclohexylamine; 2-methylpyridine; N,N-dimethylbenzylamine; N,N-diethylethanolamine; dicyclohexylamine; N,N-dimethylethanolamine; choline; N,N-dimethylpiperazine; 1,4-diazabicyclo-(2,2,2)-octane; N-methyldiethanolamine; N-methylethanolamine; N-methylpiperiine; 3-methylpiperidine; N-methylcyclohexylamine; 3-methylpyridine; 4-methylpyridine; quinuclidine; N,N'-dimethyl-1,4-diazabicyclo-(2,2,2)-octane ion; di-n-butylamine; neopentylamine; di-n-pentylamine; isopropylamine; di-isopropylamine; t-butylamine; ethylenediamine; pyrrolidine; and 2-imidazolidone. Not every templating agent will direct the formation of every species of non-zeolitic molecular sieve but a single templating agent can, with proper manipulation of the reaction conditions, direct the formation of several non-zeolitic molecular sieve compositions, and a given non-zeolitic molecular sieve composition can be produced using several different templating agents.

When the liquid reaction mixture is to contain a source of one or more elements, M, where "M" represents an element capable of forming stable M—O—P, M—O—Al, or M—O—M bonds in crystalline three dimensional oxide structures, the element(s) may be added to the reaction mixture in any form which permits the formation in situ of a reactive form of the desired elements, i.e., a form reactive to form the framework tetrahedral oxide unit of the elements present in the non-zeolitic molecular sieve. Compounds of the elements which may be employed include oxides, alkoxides, hydroxides, chlorides, bromides, iodides, sulfates, nitrates, carboxylates (e.g., acetates) and the like. Examples of elements which are represented by "M" include arsenic, beryllium, boron, chromium, cobalt, gallium, germanium, iron, lithium, magnesium, manganese, silicon, titanium, vanadium, and zinc. U.S. Pat. No. 4,973,785 describes the types of materials that may be synthesized and their method of preparation with greater specificity.

These additional elements may be prepared by forming mixtures of less than all of the reagents and thereafter incorporating into these mixtures additional reagents either singularly or in the form of other intermediate mixtures of two or more reagents. In some instances the reagents admixed retain their identity in the intermediate mixture and in other cases some or all of the reagents are involved in chemical reactions to produce new reagents. The term "mixture" is applied in both cases. Furthermore, it is preferred that the intermediate mixtures as well as the final reaction mixtures be stirred until substantially homogeneous. Preferably at least 80%, and preferably 90% by weight of these particles, and especially those of aluminum and phosphorus sources, in the reaction mixture prior to crystallization of the molecular sieve are less than 80 microns, and preferably less than 65 microns, in diameter. When the particles in the reaction mixture are larger than that specified, they are preferably reduced in size by using, for example, a high shear mixer. Mixers suitable for the process of the invention include, for example, high frequency mechanical devices such as stator-rotor systems, and energy mills, such as those described on pages 8–43,44 of Chemical Engineers' Handbook, Fifth Edition, McGraw-Hill Book Company. A typical stator-rotor device useful for this invention is the IKA UTC T115-6 generator, made by Janke and Kunkel, GMBH and Co, Germany.

A variety of analytical methods are available to practitioners for determining the size of small particles in aqueous media. One such method employs a Coulter Counter, which uses a current generated by platinum electrodes on two sides of an aperture to count the number, and determine the size, of individual particles passing through the aperture. The Coulter Counter is described in more detail in J. K. Beddow, ed., Particle Characterization in Technology, Vol 1: Applications and Microanalysis, CRC Press, Inc, 1984, p. 183–6, and in T. Allen, Particle Size Measurement, London: Chapman and Hall, 1981, pp. 392–413. A sonic sifter, which separates particles according to size by a combination of a vertical oscillating column of air and a repetitive mechanical pulse on a sieve stack, can also be used to determine the particle size distribution of particles in the aqueous reaction mixture of this invention. Sonic sifters are described in, for example, T. Allen, Particle Size Measurement, London: Chapman and Hall, 1981, pp. 175,176.

In the process of the present invention, the reaction mixture is generally placed in a sealed pressure vessel, preferably with an inactive metallic surface or alternatively, lined with an inert plastic material such as polytetrafluoroethylene (to avoid contamination of the reaction mixture) and heated, preferably under autogenous pressure, at a temperature between 100° C. and 300° C., and preferably between 150° C. and 250° C., until crystals of the non-zeolitic molecular sieve product are obtained, usually for a period of from several hours to several weeks. Effective crystallization times of from about 2 hours to about 30 days are generally employed with from about 24 to about 240 hours, and preferably about 48 hours to about 144 hours, being typically employed.

While not essential to the synthesis of the non-zeolitic molecular sieve compositions, stirring or other moderate agitation of the reaction mixture and/or seeding the reaction mixture with seed crystals of either the non-zeolitic molecular sieve species to be produced or a topologically similar aluminophosphate, aluminosilicate or molecular sieve composition, facilitates the crystallization procedure. The product is recovered by any convenient method such as centrifugation or filtration.

The non-zeolitic molecular sieves may be characterized by their X-ray powder diffraction patterns, i.e., the various crystal forms of each non-zeolitic molecular sieve, for example SAPO-11, SAPO-41, etc., may be identified and distinguished from one another by their X-ray powder diffraction patterns. Identification of the non-zeolitic molecular sieves using this technique is standard and well known in the art. This technique may also be used to determine the purity of the synthesized non-zeolitic molecular sieve product by reference to its X-ray powder diffraction pattern. Thus, for example, if a sample is stated to be pure, it is intended only to mean that the X-ray pattern of the sample is free of lines attributable to crystalline impurities, not that there are no amorphous materials present.

After crystallization the non-zeolitic molecular sieve product may be isolated and advantageously washed with water and dried. After synthesis and (optionally) calcination, a non-zeolitic molecular sieve produced by the process of the present invention may be modified by depositing or impregnating the non-zeolitic molecular sieve with cations, anions or salts so as to improve its efficacy as a catalyst in the various processes in which non-zeolitic molecular sieves are useful, as described in the aforementioned patents and applications describing non-zeolitic molecular sieves. Techniques which may be employed to effect the deposition or impregnation of a non-zeolitic molecular sieve are generally known in the art.

The non-zeolitic molecular sieves may be admixed (blended) or provided sequentially to other materials which may provide some property which is beneficial under certain process conditions, such as improved temperature resistance or improved catalyst life by minimizing coking, or which are simply inert under the process conditions used. Such materials may include synthetic or naturally-occurring substances as well as inorganic materials such as clays, silicas, aluminas, crystalline aluminosilicate zeolites, metal oxides and mixtures thereof. In addition, the non-zeolitic molecular sieves may be formed with materials such as silica, alumina, silica-alumina, silica-magnesia, silica-zirconia, silica-thoria, silica-berylia, and silica-titania, as well as ternary compositions, such as silica-alumina-thoria, silica-alumina-zirconia and clays present as binders. The relative proportions of the above materials and the non-zeolitic molecular sieves may vary widely with the non-zeolitic molecular sieve content ranging between about 1 and about 99 percent by weight of the composite.

The above descriptions and particularly, the examples are set forth for purposes of illustration only and are not meant to limit the invention. Many variations and modifications thereof will be apparent to those of ordinary skill in the art and can be made without departing from the spirit and scope of the invention herein described.

EXAMPLE 1

17.82 kg of 86% $H_3PO_4$ were added to 8.59 kg of deionized ice in a stainless steel drum with external cold water cooling. 9.70 kg of aluminum isopropoxide (Al[$OC_3H_7$]$_3$) and 21.0 kg of deionized ice were added simultaneously in small increments over a 1.5 hour time period with mixing using a standard mixing impeller and homogenization using a Polytron. 3.49 kg of di-n-propylamine were then added slowly with mixing. An additional 21.59 kg of Al[$OC_3H_7$]$_3$ and 18.0 kg ice were added in small increments over a four hour time period with mixing/homogenization, followed by an additional 3.49 kg of di-n-propylamine. 2.30 kg of fumed silica (Cabosil M-5) were then added with mixing/homogenization until >95 weight percent of the particles in the mix were smaller than 64 microns by Coulter-Counter). During the entire procedure, the temperature of the mixture never exceeded 30° C. The mixture had the following composition, expressed in molar ratio of oxides:

0.9 $Pr_2NH$: 0.5 $SiO_2$: $Al_2O_3$: 1.02 $P_2O_5$: 36 $H_2O$

A 3-gallon portion of the mixture was placed in a glass-lined 5-gallon autoclave and heated to 190° C. for three days with stirring at autogenous pressure. The supernatant liquid was removed and the product filtered, washed with water, dried overnight at 121° C., and calcined in air for 8 hours at 593° C. X-ray diffraction analysis showed the product to be SAPO-11, as disclosed in U.S. Pat. No. 4,440,871. Elemental analysis of the calcined sieve showed it to have the following anhydrous molar composition:

0.32 $SiO_2$: $Al_2O_3$: 0.98 $P_2O_5$

ESCA analysis of the surface showed the following anhydrous molar composition:

1.2 $SiO_2$: $Al_2O_3$: 0.80 $P_2O_5$

COMPARATIVE EXAMPLE

The procedure of Example 1 was followed, except that di-n-propylamine was not added after the first 9.70 kg of AL[$OC_3H_7$]$_3$. After about 60%, (19 kg), of the Al[$OC_3H_7$]$_3$ was added, a large gummy mass formed in the mixing vessel which plugged up the homogenizer and could not be re-dispersed.

EXAMPLE 2

109 grams of di-n-propylamine was added to 134 grams of deionized ice in a Teflon beaker in an ice bath. 490 grams of Al[$OC_3H_7$]$_3$ were slowly added with homogenization using a Polytron. 282.5 grams of 85% $H_3PO_4$ and 609 grams of ice were simultaneously added in small increments to the mixture with homogenization. 36 grams of Cabosil M-5 were then added with homogenization. The mixture had the following composition, expressed in molar ratio of oxides:

0.9 $Pr_2NH$: 0.5 $SiO_2$: $Al_2O_3$: 1.02 $P_2O_5$: 36 $H_2O$

The mixture was placed in a Teflon bottle in a stainless steel pressure vessel and heated for 3 days at 190° C. at autogenous pressure. The supernatant liquid was removed and the product filtered, washed with water, dried overnight at 121° C., and calcined in air for 8 hours at 593° C. X-ray diffraction analysis showed the product to be SAPO-11. Elemental analysis of the calcined sieve showed it to have the following anhydrous molar composition:

0.19 $SiO_2$: $Al_2O_3$: 0.95 $P_2O_5$

ESCA analysis of the surface showed the following anhydrous molar composition:

$SiO_2$: $Al_2O_3$: 0.83 $P_2O_5$

In Examples 3–5 the intended non-zeolitic molecular sieve product is aluminophosphate AlPO$_4$-11 as described in U.S. Pat. No. 4,310,440.

EXAMPLE 3

502 grams of 86% $H_3PO_4$ were added to a stainless steel bucket cooled in an ice bath. 240 grams of deionized ice were then added with stirring. Then 307 grams of aluminum isopropoxide (Al[$OC_3H_7$]$_3$) plus 791 grams of deionized ice were slowly added over a one-hour time period with stirring and homogenization using a Polytron. 49 grams of di-n-propylamine were then added. The amine/phosphorus molar ratio was 0.11 and the aluminum/phosphorus molar ratio at this point was 0.34. 571 grams of Al[$OC_3H_7$]$_3$ and 250 grams of ice were then slowly added over a two-hour time period with stirring and homogenization. The final aluminum/phosphorus molar ratio of the mix was 0.98. The viscosity of the mix, measured at 50° F., remained below 100 cp throughout the procedure.

EXAMPLE 4

502 grams of 86% $H_3PO_4$ were added to a stainless steel bucket cooled in an ice bath. 240 grams of deionized ice were then added with stirring. Then 307 grams of aluminum isopropoxide (Al[$OC_3H_7$]$_3$) plus 791 grams of deionized ice were slowly added over a one-hour time period with stirring and homogenization using a Polytron. 20 grams of di-n-propylamine were then added. The amine/phosphorus molar ratio was 0.045 and the aluminum/phosphorus molar ratio at this point was 0.34. 104 grams of Al[$OC_3H_7$]$_3$ and 46 grams of ice were then slowly added over a twenty-minute time period with stirring and homogenization. At the end of that time period, a large gummy mass formed in the mixing vessel which plugged up the homogenizer and could not be redispersed. At that point, the aluminum/phosphorus molar ratio in the mix was 0.45.

EXAMPLE 5

502 grams of 86% $H_3PO_4$ were added to a stainless steel bucket cooled in an ice bath. 240 grams of deionized ice were then added with stirring. 105 grams of Catapal alumina (73 wt % $Al_2O_3$, 27 wt % $H_2O$—available from Vista Chemical, Houston, Tex.) and 791 grams of deionized ice were slowly added with stirring and homogenization over a 90-minute time period. At that point, the viscosity of the mix, measured at 16° C., had risen to 29,000 cp. 98 grams of di-n-propylamine were then added. The amine/phosphorus molar ratio was 0.22 and the aluminum/phosphorus molar ratio at that point was 0.34. The viscosity of the mix fell to 15,000 cp and did not go above this value during the addition of 192 more grams of Catapal alumina (to reach an Al/P of 0.97) and 250 grams of ice.

In Examples 6 and 7 the intended non-zeolitic molecular sieve product is aluminophosphate AlPO$_4$-5.

EXAMPLE 6

502 grams of 86% H$_3$PO$_4$ were added to a stainless steel bucket cooled in an ice bath. 240 grams of deionized ice were then added with stirring. Then 307 grams of Al[OC$_3$H$_7$]$_3$ plus 791 grams of deionized ice were slowly added over a one-hour time period with stirring and homogenization using a Polytron. 100 grams of an aqueous solution of 40% tetrapropylammonium hydroxide (TPAOH) were then added. The TPA/phosphorus molar ratio was 0.045 and the aluminum/phosphorus molar ratio at this point was 0.34. 82 grams of Al[OC$_3$H$_7$]$_3$ and 46 grams of ice were then slowly added over a twenty-minute time period with stirring and homogenization. At the end of that time period, a large gummy mass formed in the mixing vessel which plugged up the homogenizer and could not be redispersed. At that point, the aluminum/phosphorus molar ratio in the mix was 0.43.

EXAMPLE 7

502 grams of 86% H$_3$PO$_4$ were added to a stainless steel bucket cooled in an ice bath. 240 grams of deionized ice were then added with stirring. Then 307 grams of Al[OC$_3$H$_7$]$_3$ plus 791 grams of deionized ice were slowly added over a one-hour time period with stirring and homogenization using a Polytron. 400 grams of an aqueous solution of 40% tetrapropylammonium hydroxide (TPAOH) were then added. The TPA/phosphorus molar ratio was 0.18 and the aluminum/phosphorus molar ratio at this point was 0.34. 571 grams of Al[OC$_3$H$_7$]$_3$ were then slowly added over a two-hour time period with stirring and homogenization. The final aluminum/phosphorus molar ratio of the mix was 0.98. The viscosity of the mix, measured at 50° F., remained below 100 cp throughout the procedure.

What is claimed is:

1. In a method for preparing a crystalline non-zeolitic molecular sieve having a three-dimensional microporous framework structure comprising [AlO$_2$] and [PO$_2$] units, wherein the method for preparing the molecular sieve includes the steps of preparing an aqueous reaction mixture comprising at least one reactive source of phosphorus, at least one reactive source of aluminum, and at least one templating agent, and having a Al$_2$O$_3$:P$_2$O$_5$ molar ratio greater than 0.3; and maintaining the aqueous reaction mixture at conditions suitable for crystals of the molecular sieve to form, the improvement comprising controlling the addition of the phosphorus source, aluminum source, and the templating agent to the aqueous reaction mixture so that the templating agent to the phosphorus molar ratio is greater than about 0.05 before the aluminum to phosphorus molar ratio reaches about 0.5.

2. The method of claim 1 wherein said molar ratio of the templating agent to the phosphorus is greater than about 0.1 before the mole ratio of aluminum to phosphorus reaches about 0.5.

3. The method of claim 2 wherein said molar ratio of the templating agent to the phosphorus is greater than about 0.2 before the molar ratio of aluminum to phosphorus reaches about 0.5.

4. The method of claim 1, 2, or 3 wherein said molar ratio of templating agent to phosphorus is present in the reaction mixture before the molar ratio of aluminum to phosphorus is greater than about 0.3.

5. The method of claim 1 wherein said aluminum source is selected from the group consisting of aluminum alkoxide or pseudoboehmite.

6. The method of claim 5 wherein said aluminum alkoxide is aluminum isopropoxide.

7. The method of claim 1 wherein the aqueous solution further comprises a reactive source of at least one element "M" capable of forming stable M—O—P, M—O—Al, or M—O—M bonds in crystalline three dimensional oxide structures.

8. The method of claim 7 wherein said element "M" is selected from the group consisting of arsenic, beryllium, boron, chromium, cobalt, gallium, germanium, iron, lithium, magnesium, manganese, silicon, titanium, vanadium, and zinc.

9. The method of claim 8 wherein element "M" is selected from the group consisting of silicon, magnesium, manganese, cobalt, or zinc.

10. The method of claim 9 wherein element "M" is silicon.

11. The method of claim 1 wherein said templating agent is a quaternary ammonium or quaternary phosphonium compound having the following formula:

$$R_4X+$$

wherein X is nitrogen or phosphorus and each R is an alkyl or aryl group containing from 1 to 8 carbon atoms.

12. The method of claim 1 wherein the templating agent is an amine.

13. The method of claim 1 wherein the templating agent is selected from the group consisting of tetramethylammonium, tetraethylammonium, tetrapropylammonium and tetrabutylammonium ions; tetrapentylammonium ion; di-n-propylamine; tripropylamine; triethylamine; triethanolamine; piperidine; cyclohexylamine; 2-methylpyridine; N,N-dimethylbenzylamine; N,N-diethylethanolamine; dicyclohexylamine; N,N-dimethylethanolamine; choline; N,N-dimethylpiperazine; 1,4-diazabicyclo-(2,2,2)-octane; N-methyldiethanolamine; N-methylethanolamine; N-methylpiperiine; 3-methylpiperidine; N-methylcyclohexylamine; 3-methylpyridine; 4-methylpyridine; quinuclidine; N,N'-dimethyl-1,4-diazabicyclo-(2,2,2)-octane ion; di-n-butylamine; neopentylamine; di-n-pentylamine; isopropylamine; di-isopropylamine; t-butylamine; ethylenediamine; pyrrolidine; 2-imidazolidone; and a polymeric quaternary ammonium salt [(Cl$_4$H$_{32}$N$_2$)(OH)$_2$]x wherein x has a value of at least 2.

14. The method of claim 1 wherein the non-zeolitic molecular sieve produced is an aluminophosphate having a framework structure whose chemical composition expressed in terms of mole ratios of oxides is:

$$Al_2O_3:1.0\pm0.2\ P_2O_5$$

each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state.

15. The method of claim 14 wherein the non-zeolite molecular sieve produced is AlPO$_4$-5, AlPO$_4$-11, or AlPO$_4$-31.

16. The method of claim 1 wherein the non-zeolitic molecular sieve produced is a silicoaluminophosphate the pores of which are uniform and have nominal diameters of greater than about 3 Angstroms and whose essential empirical chemical composition in the as-synthesized and anhydrous form is $$mR:(Si_xAl_yP_z)O_2$$

where R represents at least one organic templating agent present in the intracrystalline pore system; m has a value of from 0.02 to 0.3; m represents the moles of R present per mole of $(Si_xAl_yP_z)O_2$; x, y and z represent the mole fractions of silicon, aluminum and phosphorus respectively, present as tetrahedral oxides, said mole fractions being such that they are within the pentagonal compositional area defined by points A B C D and E of the ternary diagram in FIG. 1.

17. The method of claim 16 wherein the non-zeolitic molecular sieves produced is any one or more of SAPO-5, SAPO-11, SAPO-31, or SAPO-41.

18. The method of claim 1 wherein the non-zeolitic molecular sieve produced is a silicoaluminophosphate having a characteristic X-ray powder diffraction pattern which shows the following characteristic lines

| 2θ | d | 100 × I/Io |
|---|---|---|
| 9.4–9.65 | 9.41–9.17 | m |
| 20.3–20.6 | 4.37–4.31 | m |
| 21.0–21.3 | 4.23–4.17 | vs |
| 22.1–22.35 | 4.02–3.99 | m |
| 22.5–22.9 (doublet) | 3.95–3.95 | m |
| 23.15–23.35 | 3.84–3.81 | m–s | where m=20–70; s=70–90; vs=90–100, and wherein the $P_2O_5$ to alumina mole ratio at the surface of the silicoaluminophosphate is about 0.80 or less, the $P_2O_5$ to alumina mole ratio of the bulk of the silicoaluminophosphate is 0.96 or greater, and the $SiO_2$ to alumina mole ratio at the surface is greater than in the bulk of the silicoaluminophosphate.

19. The method of claim 1 wherein the non-zeolitic molecular sieve produced is $AlPO_4$-41.

* * * * *